Figure 15:
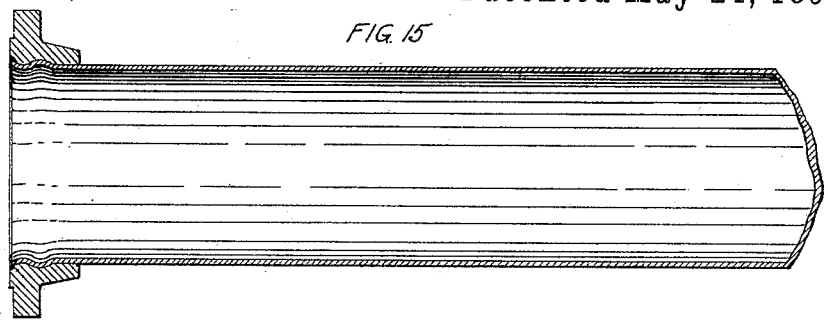

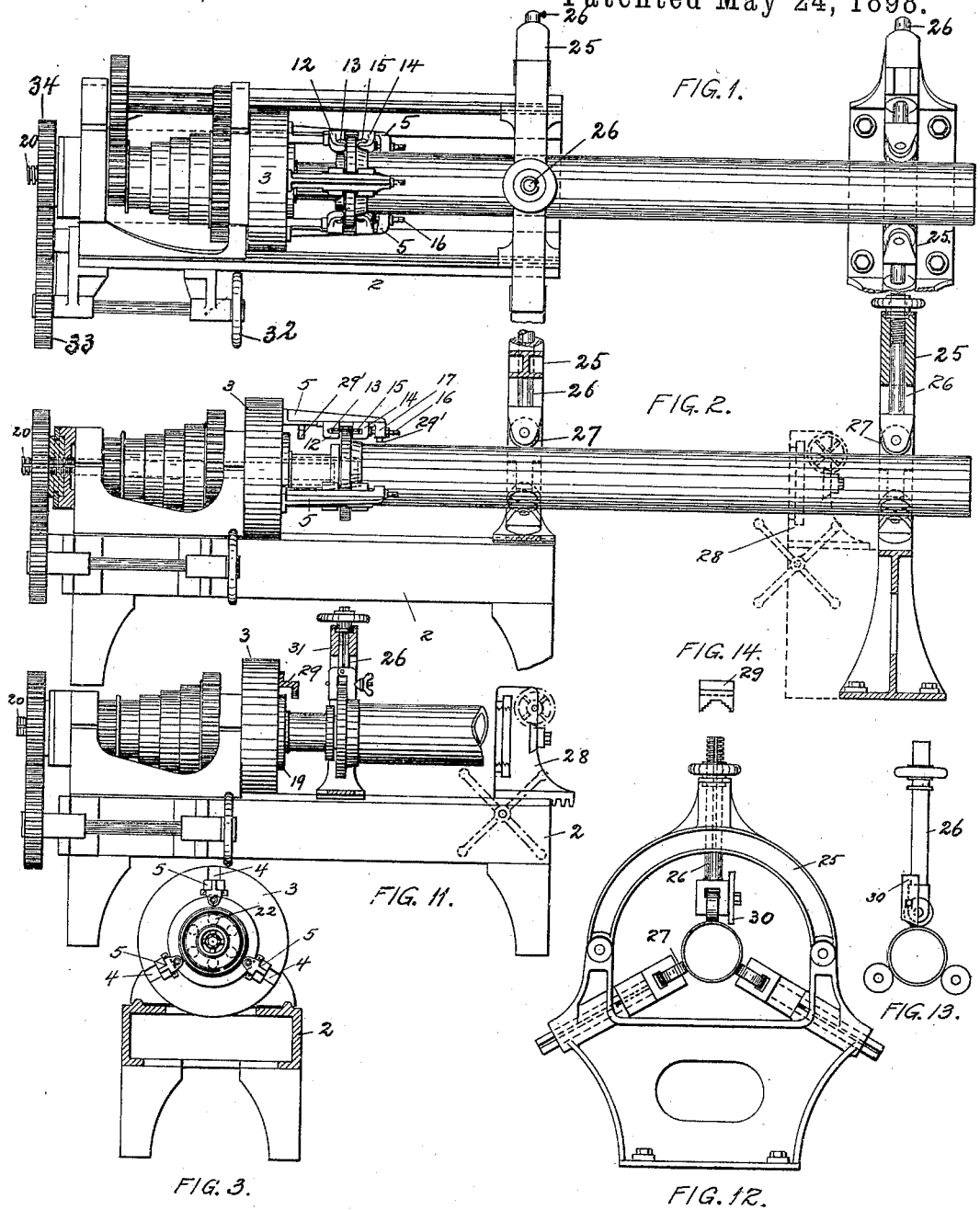

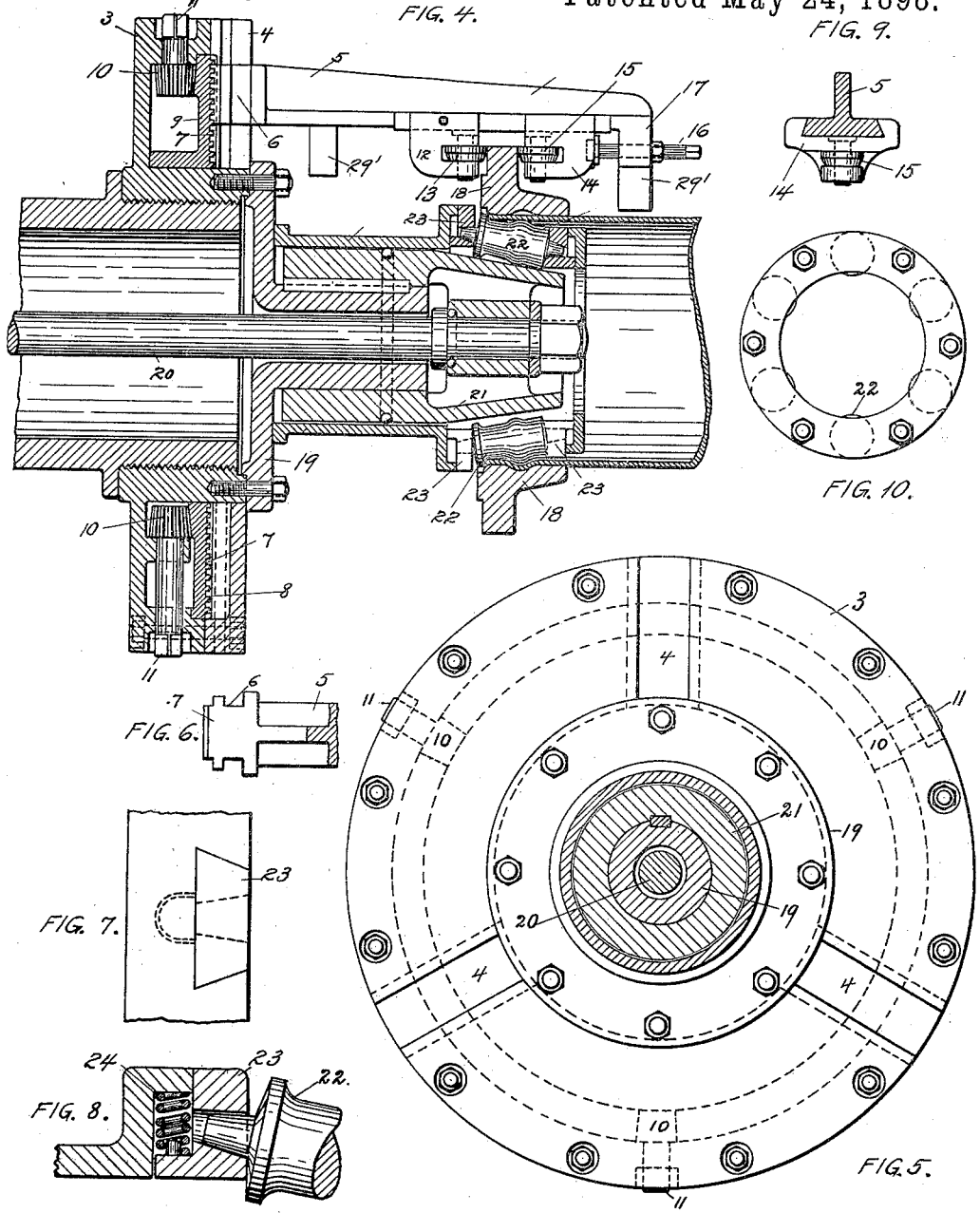

(No Model.) 3 Sheets—Sheet 3.

C. W. A. KOELKEBECK & J. K. SMITH.
MACHINE FOR CUTTING AND EXPANDING PIPES.

No. 604,664. Patented May 24, 1898.

UNITED STATES PATENT OFFICE.

CARL W. A. KOELKEBECK AND JOSEPH K. SMITH, OF PITTSBURG, PENNSYLVANIA.

MACHINE FOR CUTTING AND EXPANDING PIPES.

SPECIFICATION forming part of Letters Patent No. 604,664, dated May 24, 1898.

Application filed August 28, 1897. Serial No. 649,847. (No model.)

*To all whom it may concern:*

Be it known that we, CARL W. A. KOELKEBECK and JOSEPH K. SMITH, of Pittsburg, in the county of Allegheny and State of Pennsylvania, have invented a new and useful Improvement in Machines for Cutting and Expanding Pipes, of which the following is a full, clear, and exact description, reference being had to the accompanying drawings, forming part of this specification, in which—

Figure 1 is a top plan view of our improved machine. Fig. 2 is a side elevation of the same. Fig. 3 is a cross-section. Fig. 4 is an enlarged sectional view of the head and chuck. Fig. 5 is a face view of the head. Figs. 6, 7, 8, 9, and 10 are details of portions of the head and chuck. Fig. 11 is a side elevation of another form of the machine. Fig. 12 is a cross-section of a portion of this modified form. Fig. 13 is a diagrammatic view showing the cutter arranged to cut the pipe. Fig. 14 is a detail view of one of the radial grippers used in screw-threading and cutting; and Figs. 15 to 17, inclusive, show different forms of pipe which have been peened or expanded by our apparatus.

Our invention relates generally to the class of pipe cutting and threading machines and is designed to provide an attachment for such machines whereby the end portion of the pipe may be peened out or expanded into a flange, which is made separate therefrom.

In the drawings, in which like numerals indicate corresponding parts, 2 represents the frame of the machine, which is provided with the usual rotating head 3, carried at the end of a shaft mounted in bearings in the frame. In the front portion of this head are provided a series of radial guides 4, within which are adjustably carried the horizontal arms 5, the rear portions of these arms having side grooves 6, arranged to receive the ribs of the guides. The rear ends of these arms are provided with transverse teeth 7, which intermesh with teeth 8 upon the face of a rotary plate 9, mounted in the head and arranged to be rotated by small pinions 10, having shafts with squared protruding ends 11 to receive wrenches. The teeth of the plate are so arranged that upon turning the plate the arms 5 will all be moved inwardly or outwardly a like distance. Each of the arms 5 is provided with a fixed yoke 12, carrying a small horizontal roller 13, and with a movable jaw or yoke 14, carrying a similar roller 15. The yoke 14 preferably has a sliding dovetailed connection with the arm, as shown in Fig. 9, and is moved back and forth by the shaft 16, having screw-threaded engagement with and passing through a bracket 17 at the end of the arm. By means of these arms 5 and their jaws the flange or ring 18, to which the end of the pipe is secured, is rotatably held and guided in proper position and may be adjusted to a plane exactly at right angles to that of the pipe and held in such plane.

To the head 3 is secured a central chuck 19, which rotates therewith and through which projects the shaft 20, the end portion of which is rotatably secured within the hollow mandrel 21, the front portion of which is tapered, as shown, while its rear portion is mounted in ball-bearings in the chuck. The tapered portion of the mandrel contacts directly with the peening-rollers 22, the ends of which are supported within bearings in dovetailed slides 23, movable radially within guides in the chuck, and to keep these rollers in contact with the mandrel we preferably employ springs 24, as shown in Fig. 8, which normally press the slides 23 inwardly.

To reciprocate the shaft 20, we provide a hand-wheel 32, the wheel 33 upon whose shaft intermeshes with the gear-wheel 34, through which the shaft passes. The shaft 20 and wheel 34 are provided with interfitting screw-threads, so that upon rotation of the wheel the shaft will be moved endwise.

To guide and hold the pipe in position while expanding the same, we provide suitable frames 25, which are spaced apart any desired distance along the length of the pipe and in each of which are carried radially-adjustable spindles 26, carrying at their ends rollers 27, which normally lie in longitudinal planes of the pipe, so that the pipe may be slid longitudinally through the frames into position for peening and then secured in such position.

In Figs. 2 and 11 we show at 28 the ordinary screw-threading and cutting apparatus, and when this is being used upon the pipe we grasp and rotate the same by means of ordinary grippers 29, (shown in Figs. 11 and 14,) these grippers holding the end of the pipe and rotating the same. Instead of making the grippers separate from the arms 5, as shown in Fig. 11, we may make the grippers a part of these arms, as shown at 29' in Figs. 2 and 4. In this operation the spindles 26 are swung so as to bring their planes at right angles to the length of the pipe, as shown in Fig. 13, thus allowing the pipe to rotate within them while guided thereby.

For cutting the pipe we may attach another cutting-tool 30 to one of the spindles 26, as shown in Fig. 13, this cutter being adjusted as desired to sever the pipe, which is guided by the spindle-rollers, as shown in this figure.

Figure 16:
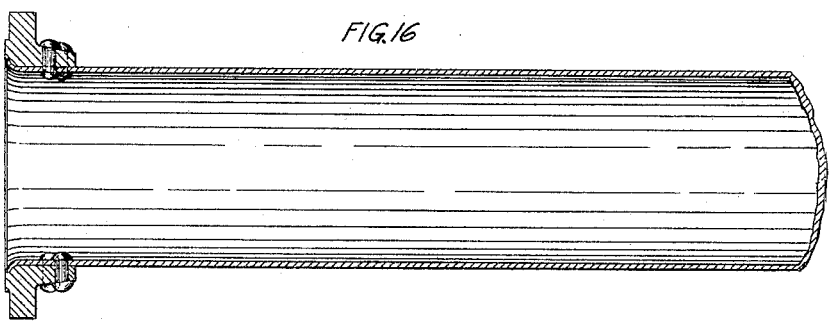
Figure 17:
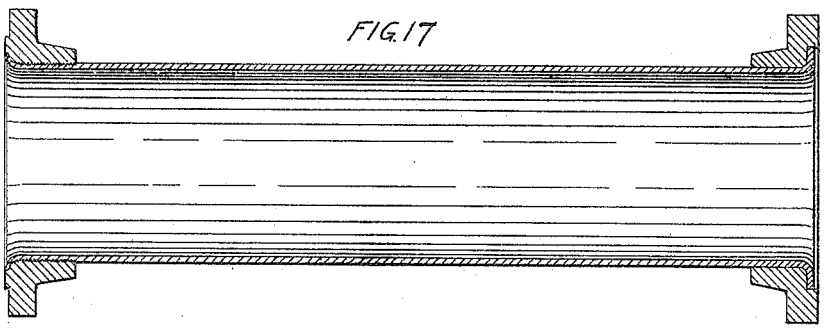

The peening-rollers may be of any suitable shape to correspond with the inner face of the flange or ring 18, and we show in Figs. 15 to 17 a series of pipes the ends of which have been peened in different forms.

The arms for holding the ring or flange 18 may be secured to the frame of the machine, as shown at 31 in Fig. 11, instead of being secured to the head, as shown in Figs. 1, 2, and 4.

The operation of our device is apparent, the pipe being held against rotation while the peening operation is proceeding, the peening-rollers being forced outwardly by the tapered mandrel, so as to expand the end of the pipe into the ring, which is rotatably held between the rollers of the arms. In screw-threading and cutting the spindles are turned through an angle of ninety degrees, so as to bring them at right angles to the pipe, which is rotated within their end rollers by the grippers upon the rotary head of the machine.

The advantages of our invention will be apparent to those skilled in the art, since by our invention a simple and cheap attachment is provided which may be easily put on old machines for cutting or screw-threading pipe, or upon lathes, and by which the operation is quickly and cheaply performed. The parts are easily adjusted to different sizes and shapes of the pipes and flanges, and the construction is simple and not liable to get out of order.

Variations in the form, construction, and relative arrangement of the parts of the device may be made by the skilled mechanic without departure from our invention; since

What we claim is—

1. In apparatus for securing tubes to rings or flanges, a rotatory head provided with a central expanding-chuck, said head having secured thereto and rotatory therewith holders for the ring into which the pipe is expanded.

2. In pipe-expanding apparatus, a rotatory head having radially-movable arms, and rollers in the arms arranged to guide and hold in place the flange into which the pipe is expanded.

3. In a pipe-expanding machine, a rotatory head having a chuck arranged to expand the pipe, and a series of radially-movable holders mounted in frames and having rollers bearing upon the pipe, the planes of the rollers lying longitudinally of the pipe.

4. A pipe cutting and expanding machine having a rotary head, a chuck secured to the head and having means for expanding the pipe, said head having radially-movable grippers arranged to seize and rotate the pipe in cutting the same.

5. In pipe cutting and expanding apparatus, a rotatory head, a chuck secured thereto and having means for expanding the pipe, holders for the ring into which the pipe is expanded, and spindles having rollers arranged to bear upon and guide the pipe.

6. In apparatus for expanding pipe, a head having radially-movable arms, means for moving said arms simultaneously in a radial direction, rollers upon the arms arranged to engage a ring or flange and hold the same in position, a chuck centrally secured to the head and having an inner hollow tapered mandrel rotatable therewith, means for sliding said mandrel longitudinally, and peening-rollers movably mounted in the chuck and engaged by the tapered mandrel.

7. In pipe-expanding apparatus, a rotary head having radially-adjustable arms, and rollers in said arms arranged to engage and hold a ring or flange in position for peening the pipe thereinto, one of said rollers being movable to and from the other.

In testimony whereof we have hereunto set our hands.

CARL W. A. KOELKEBECK.
JOSEPH K. SMITH.

Witnesses:
JOHN REBMAN,
BOYD CRUMRINE.